US007009645B1

(12) United States Patent
Sandini et al.

(10) Patent No.: US 7,009,645 B1
(45) Date of Patent: Mar. 7, 2006

(54) CONSTANT RESOLUTION AND SPACE VARIANT SENSOR ARRAYS

(75) Inventors: Giulio Sandini, Genoa (IT); Paolo Questa, Genoa (IT); Danny Scheffer, Clinge (NL)

(73) Assignees: Imec Vzw, Leuven (BE); Aitek, Genoa (IT)

( * ) Notice: Subject to any disclaimer, the term of this patent is extended or adjusted under 35 U.S.C. 154(b) by 850 days.

(21) Appl. No.: 09/675,095

(22) Filed: Sep. 28, 2000

Related U.S. Application Data

(60) Provisional application No. 60/160,276, filed on Oct. 19, 1999.

(30) Foreign Application Priority Data

Sep. 30, 1999 (EP) .................................. 99203202

(51) Int. Cl.
*H04N 3/14* (2006.01)
*H04N 5/225* (2006.01)
*G01J 1/42* (2006.01)
(52) U.S. Cl. ..................... 348/275; 348/374; 250/208.6
(58) Field of Classification Search ................ 348/275, 348/315, 62, 76, 264, 266, 272, 273, 274, 348/280, 281, 332, 240, 374, 340; 250/208.1, 250/208.6
See application file for complete search history.

(56) References Cited

U.S. PATENT DOCUMENTS

| 4,267,573 | A |   | 5/1981  | Chaikin et al. |
| 4,554,585 | A | * | 11/1985 | Carlson ....................... 348/342 |
| 5,063,604 | A | * | 11/1991 | Weiman ....................... 382/170 |
| 5,166,511 | A | * | 11/1992 | Kreider et al. ........... 250/208.1 |
| 5,587,580 | A |   | 12/1996 | Venier et al. |
| 5,712,729 | A |   | 1/1998  | Hashimoto |
| 5,739,852 | A | * | 4/1998  | Richardson et al. ......... 348/315 |
| 5,887,078 | A | * | 3/1999  | Kwon et al. ................. 382/156 |
| 6,455,831 | B1 | * | 9/2002  | Bandera et al. .......... 250/208.1 |
| 6,522,356 | B1 | * | 2/2003  | Watanabe .................... 348/272 |
| 6,526,160 | B1 | * | 2/2003  | Ito ............................. 382/117 |
| 6,563,101 | B1 | * | 5/2003  | Tullis ....................... 250/208.1 |
| 2002/0180877 | A1 | * | 12/2002 | Kikuchi ....................... 348/315 |

(Continued)

FOREIGN PATENT DOCUMENTS

FR              2830128 A1 *   3/2003

(Continued)

OTHER PUBLICATIONS

Pardo et al.; "Space-Variant Nonorthogonal Structure CMOS Image Sensor Design"; Jun. 1998; IEEE Journal of Solid-State Circuits; vol. 33, No. 6.*

(Continued)

*Primary Examiner*—Thai Tran
*Assistant Examiner*—John M. Villecco
(74) *Attorney, Agent, or Firm*—Knobbe, Martens Olson & Bear LLP

(57) ABSTRACT

A sensor array is described comprising a substantially constant resolution portion comprising a first series of first concentric closed rings, each first closed ring comprising a monodimensional array of equally spaced sensor element location sites, each location site including at aleast one sensor element; and a spatially variant portion comprising a second series of second concentric closed rings, the second series being concentric with the first series and each second closed ring comprising a monodimensional array of equally spaced sensor element location sites, each location site having at least one sensor element, the spatially variant portion surrounding or being surrounded by the substantially constant resolution portion, and the density of sensor element location sites continuously increasing or decreasing between the substantially constant resolution portion and the spatially variant portion.

4 Claims, 14 Drawing Sheets

U.S. PATENT DOCUMENTS

2004/0095492 A1 * 5/2004 Baxter et al. ............... 348/302

FOREIGN PATENT DOCUMENTS

JP 03116781 A * 5/1991

OTHER PUBLICATIONS

Pardo et al.; "CMOS Foveated Image Sensor: Signal Scaling and Small Geometry Effects"; Oct. 1997; IEEE Transaction on Electron Devices; vol. 44, No. 10.*

Sandini et al.; "A Retina-like CMOS Sensor and its Applications"; Mar. 16-17, 2000; Proceedings of the 2000 IEEE Sensor Array and Multichannel Signal Processing Workshop; pp. 514-519.*

Questa et al.; "Time to Contact Computation with a Space-Variant Retina-like CMOS Sensor"; Proceedings of the 1996 IEEE/RSJ International Conference on Intelligent Robots and Systems '96; Nov. 4-8, 1996; vol. 3, pp. 1622-1629.*

Rojer et al.; "Design Consideration for a Space-Variant Visual Sensor with Complex-Logarithmic Geometry"; Proceedings of the 10th International Conference on Pattern Recognition; Jun. 16-21, 1990; vol. 2, pp. 278-285.*

Etienne-Cummings et al.; "A Foveated Silicon Retina for Two-Dimensional Tracking"; IEEE Transactions on Circuits and Systems II: Analog and Digital Signal Processing; Jun. 2000; vol. 47, No. 6, pp. 504-517.*

Wodnicki et al.; "A Log-Polar Image Sensor Fabricated in a Standard 1.2um ASIC CMOS Process"; Aug. 1997; IEEE Journ of Solid-State Circuits, VOl. 32, No. 8; pp. 1274-1277.*

Haig, H. et al.; "A Model of Human Vision for Machines"; SPIE vol. 728 Optics, Illumination and Image Sensing for Machine Vision, pp. 19-27, 1986.*

Bandera, C. et al.; "Foveal Machine Vision Systems"; Proceedings of the IEEE International Conference on Systems, Man and Cybernetics, Cambridge, MA; pp. 596-599, Nov. 1989.*

Scott, P et al.; "Hierarchical Multiresolution Data Structures and Algorithms for Foveal Vision Systems"; Proceedings of the IEEE International Conference on Systems, Man, and Cybernetics, Los Angeles, CA; Nov. 1990.*

Bandera, C. et al.; "Retinotopic Processing for Active Foveal Vision"; Proceedings of ACCV '95 :Second Asian Conference on Computer Vision, vol. 2, Singapore, Dec. 5-8, 1995.*

Shandle, J.; "Technology Advances, Retina-Like Image Sensor Promises Real-Time Systems"; Electronic Design, May 3, 1993.*

Wodnicki et al.; "A Foveated Image Sensor in Standard CMOS Technology"; Custom Integrated Circuits Conference, 357-60, 1995.

* cited by examiner

CONSTANT RESOLUTION AND SPACE VARIANT SENSOR ARRAYS

This invention claims priority to U.S. Provisional Patent Application No. 60/160,276, filed Oct. 19, 1999.

The present invention relates to the provision of an array of sensor elements especially radiation sensitive elements. Such arrays may find advantageous use in cameras.

TECHNICAL BACKGROUND

Solid state image sensors are well known. Commonly solid state image sensors are implemented in a CCD-technology or in a CMOS- or MOS-technology. Solid state image sensors find a widespread use in camera systems. A matrix of pixels comprising light sensitive elements constitutes an image sensor, which is mounted in the camera system. The signal of the matrix is measured and transformed to a so-called video-signal.

CCD-based camera systems have less noise fluctuations in the image compared to CMOS- or MOS-based camera systems. Therefore CCD-based camera systems are nowadays preferred in applications wherein a high image quality is required such as video or still camera applications. Due to the further miniaturization of the CMOS electronics technology, it is possible to realize complex CMOS- or MOS-based pixels as small as CCD-based pixels. It is a further advantage of CMOS- or MOS-based pixels that CMOS is a technology being widely offered whereas CCD-technology is rarely offered and is a more complex and expensive one.

Of the image sensors implemented in a CMOS- or MOS-technology, CMOS or MOS image sensors with passive pixels and CMOS or MOS image sensors with active pixels are known. An active pixel is configured with means integrated in the pixel to amplify the charge that is collected on the light sensitive element. Passive pixels do not have such means and require a charge-sensitive amplifier that is not integrated in the pixel but is connected with a line towards the pixel.

The use of space-variant visual sensors in image communication and processing is graining more and more attention as a simple and direct way of reducing the visual information transmitted and/or processed while preserving both high resolution and a wide field of view.

Several attempts have been made to make visual sensors which are compact and which provide good resolution at least in a central portion of the sensor array. One such sensor array is known from U.S. Pat. No. 5,166,511 and includes a central square CCD array and outer rings of radiation sensitive elements. This device has the disadvantage that there is a significant discontinuity between the central Cartesian array and the outer polar array. A similar device in CMOS technology is described in the article by Wodnicki et al. entitled "A foveated image sensor in standard CMOS technology", Proc. Custom Integrated Circuits Conf pages 357–360, 1995. A further attempt has been made and an enlarged view of the central portion of the sensor array is shown in FIG. 1. As can be seen, radial lines of sensors end abruptly causing a local discontinuity in resolution. Although the transition between the central sensor array region and the outer region is better than previously mentioned examples, there are still local discontinuities which can affect picture quality.

U.S. Pat. No. 4,267,573 describes an interesting device in which the sensors are located on logarithmic spirals. However, at the center of the sensor array the sensor density approaches infinity. Hence, for the central region another solution has to be found, e.g. a hole is left in the middle where there are no sensors. U.S. Pat. No. 5,587,580 shows a polar array of sensor elements. However, how the central region is dealt with is not described. U.S. Pat. No. 5,712,729 shows a non-spatially variant array based on a hexagonal geometrical pattern. Non-spatially variant arrays are wasteful of sensors at large radii. Further, a hexagonal geometry also includes a local discontinuity at each apex.

The present invention has for its object to realize a spatially variant sensor array which is substantially free of local or global discontinuities.

Still a further object of the present invention is to provide an electronic camera with a spatial arrangement which may have a similar functionality to that of the human retina.

SUMMARY OF THE PRESENT INVENTION

The present invention may provide a sensor array comprising: a substantially constant resolution portion comprising a first series of first concentric closed rings, each first closed ring comprising a monodimensional array of equally spaced sensor element locations, each location including at aleast one sensor element; and a spatially variant portion comprising a second series of second concentric closed rings, the second series being concentric with the first series and each second closed ring comprising a monodimensional array of equally spaced sensor element locations, each location having at least one sensor element, the spatially variant portion surrounding or being surrounded by the substantially constant resolution portion, and the density of sensor element locations continuously increasing or decreasing between the substantially constant resolution portion and the spatially variant portion.

Dependent claims relate to preferred embodiments of such a spatially variant sensor array. At each sensor location site there may be one or more sensor elements, e.g. in a color sensor array each sensor location site may include three sensor elements, each one sensitive to a primal color such as red, green or blue. The sensor elements may be identical with respective filters arranged in the light path to select the wavelength or wavelength range to be detected by each sensor element. An efficient number of sensor elements may be used in accordance with certain embodiments of the present invention by varying the resolution from a central region having a substantially uniform resolution to an outer region having a spatially variant resolution. The present invention may find advantageous use in an integrated design of a solid state sensor, which may be combined with a lens and driving electronics in a miniature camera device.

The present invention may include a substantially constant resolution sensor array comprising a first series of concentric closed rings, each closed ring comprising a monodimensional array of equally spaced sensor element locations, each location having at least one sensor element, in which the number of sensor element locations in each closed ring is defined by the $i^{th}$ closed ring having n sensor element locations and the i+1$^{th}$ closed ring having n+m sensor element locations where n is not equal to 1, and the envelope through the middle of the sensor element locations of one closed ring is a closed smooth curve. The closed smooth curve may be a circle, ellipse, oval, egg-shape or similar. Dependent claims relate to preferred embodiments of such a substantially constant resolution sensor array.

Further advantages, features and details will become apparent in the light of a description of preferred embodiments according to the present invention, in reference is made to the following drawings.

DEFINITIONS

Figure 1:
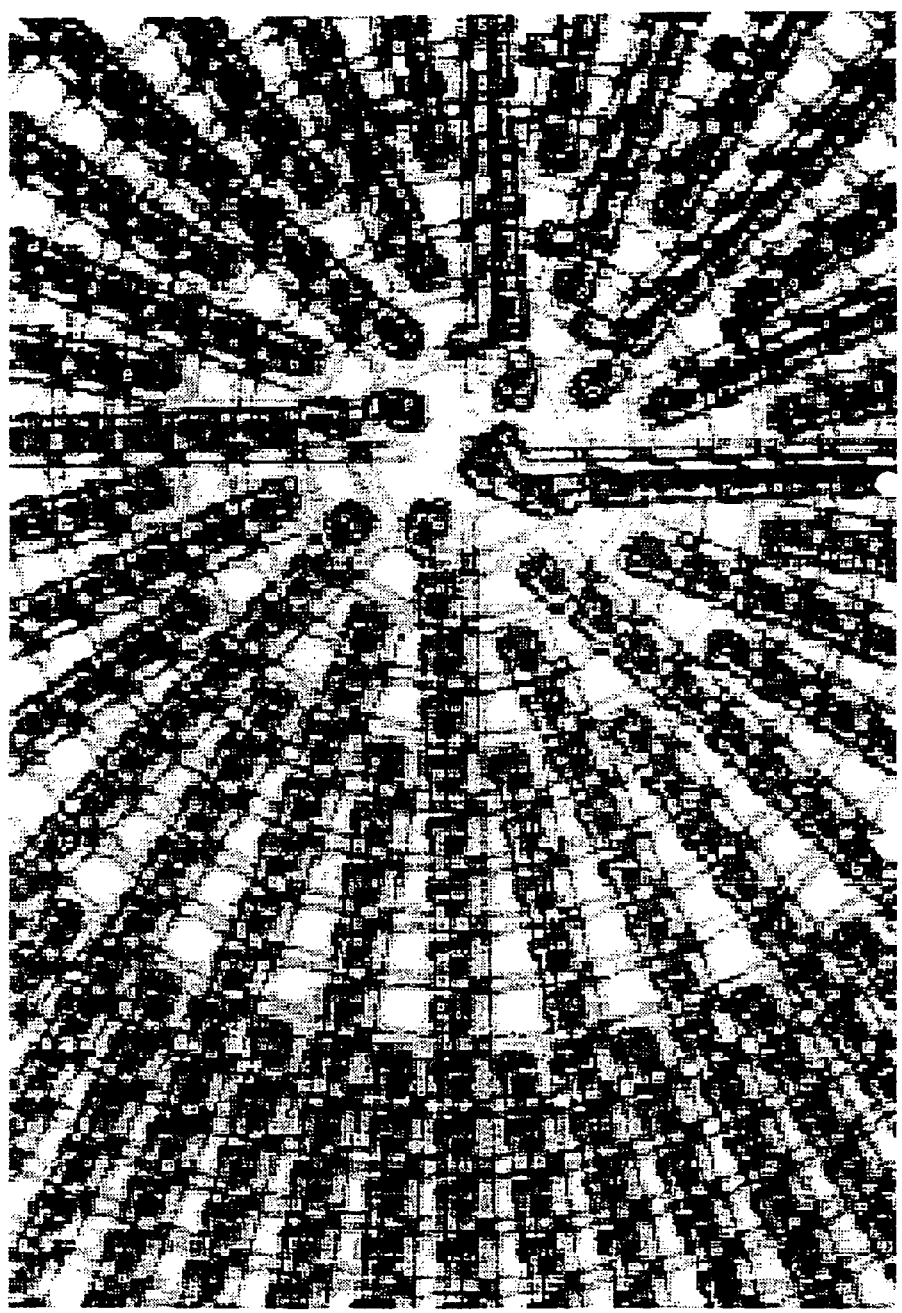
FIG. 1 shows a diagram of the center of a conventional CMOS spatially variant imaging sensor.

Ring: closed curve covered by a monodimensional array (=a line) of equally spaced sensor element location sites, each location site including at least one sensor element.

Aspect ratio: the ratio between the radial and the angular distances dimension of each sensor element location site or of each sensor. Alternatively, the ratio between the mid-line to mid-line radial distance between neighboring rings and the angular distance between neighboring sensor element location sites or sensors.

Sensor density: number of sensor elements per unit area or the number of sensor element location sites per unit area. There can be a global and local density values. A global density is the density for the whole array or of a significant part of an array. Local density is the density of a small area of the array, e.g. defined by a sensor element location site or a sensor element and its neighbors. Sensor geometries with local discontinuities generally show local variations in local density. A log-polar array has a local resolution which varies linearly with radius.

Resolution: the inverse of the centre—centre distance between adjacent sensor element location sites or between sensor elements, for example it may be quoted as "dots per inch", "pixels per inch" or similar. There can be a global and local resolution. A global resolution is the resolution typically possible for the whole array or for large part of an array. Local resolution is the centre—centre distance between sensor elements or sensor element location sites in a small area of the array, e.g. between one sensor element location site or sensor element and its neighbors. Sensor geometries with local discontinuities generally show local variations in local resolution.

Closed smooth curve: a closed figure which is non-polygonal. Examples are circle, ellipse, oval, egg-shape.

DESCRIPTION OF THE ILLUSTRATIVE EMBODIMENTS

The present invention will be described with reference to certain embodiments and drawings but is not limited to these but only by the claims. The drawings are schematic. The present invention will mainly be described with reference to a radiation sensitive sensor array but the present invention is not limited thereto. For instance, the sensor element geometries of the present invention may be made with any suitable sensor elements, e.g. tactile sensor elements, proximity sensors.

The present invention relates to the provision of a synthetic sensor array with a substantially constant resolution portion. By synthetic is meant that natural sensor arrays such as the human eye are excluded. The substantially constant resolution portion may be used with a spatially variant portion which either surrounds the substantially constant resolution portion on the outside or is enclosed by the substantially constant resolution portion. There are advantages for use in robotics if the radial change of the sensor element density or if the resolution of the array is spatially variant. Such a spatial variance may form an approximation of the resolution of radiation-sensitive elements occurring in the human retina but the present invention is not limited thereto. The size of the smallest sensor element or photosite is determined by the technology used to make the site. It is preferred in the present invention to use conventional CMOS or MOS semiconductor processing technology but the present invention is not limited thereto and includes other manufacturing technologies and devices made therefrom, such as CCD arrays. Also the present invention is not limited to visual light sensors but may be used with any radiation sensitive elements, e.g. those sensitive to X-rays or infra-red or ultra-violet radiation. In particular, sensor arrays in accordance with the present invention need not be radiation sensitive, they may be used, for instance, with tactile sensors, e.g. to model a synthetic finger tip.

Semiconductor processing technology is continuously improving and the size of semiconductor elements which can be produced is constantly being made smaller. The sensors of the present invention may be conveniently manufactured in 0.35 micron CMOS technology but the present invention is not limited thereto. An individual sensor with such technology may have a diameter of about 7 micron. As the size of sensor elements becomes smaller it is tempting to use a uniform array of sensors, e.g. a Cartesian array, and then to use electronic re-mapping (e.g. log-polar mapping) to create a kind of spatial variance. However, such an array makes poor use of the large number of outer sensor elements as these are at the extremes of the field of view of a camera where high resolution is not so relevant. The number of these elements increases as the square of the radius so the total number of elements of such a uniform array compared to a space variant one is significantly larger. This increases processing time and therefore the cost of the sensor array.

Figure 16:
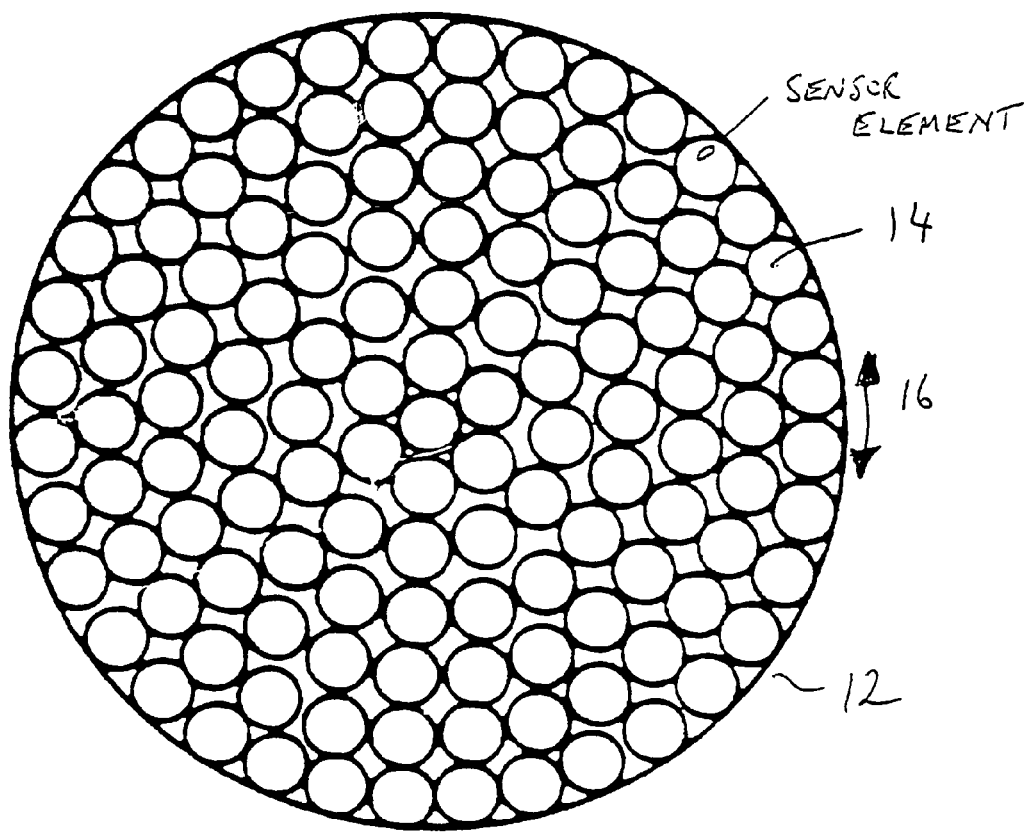
FIG. 16 shows an embodiment of sensor location sites of a substantially constant resolution portion of a sensor array.

In the following reference will be made to sensor element location sites 14 and sensor elements. An example will be described for sensor element location sites with a symmetry of 6 (see below) but the skilled person will appreciate that the principles may be extended to a range of symmetries. In FIG. 16 a series of concentric rings 16 of areas 14 is shown. These areas 14 are locations in which at least one sensor element is located hence they are sensor element location sites 14. More than one sensor element may be located in the each sensor element location site 14. Also a sensor element need not be located at the center of a sensor element location site 14. It is included within the present invention that a sensor element may be displaced from the center of a sensor element location, for example the displacements may be small, random in size and random in direction. This introduces a "dither" in the placement of sensor elements which may be of advantage, e.g. it breaks up any symmetries in the geometry thus eliminating Moiré fringes caused by viewing an image with an almost identical geometry to that of the arrangement of sensor elements.

Figure 17:
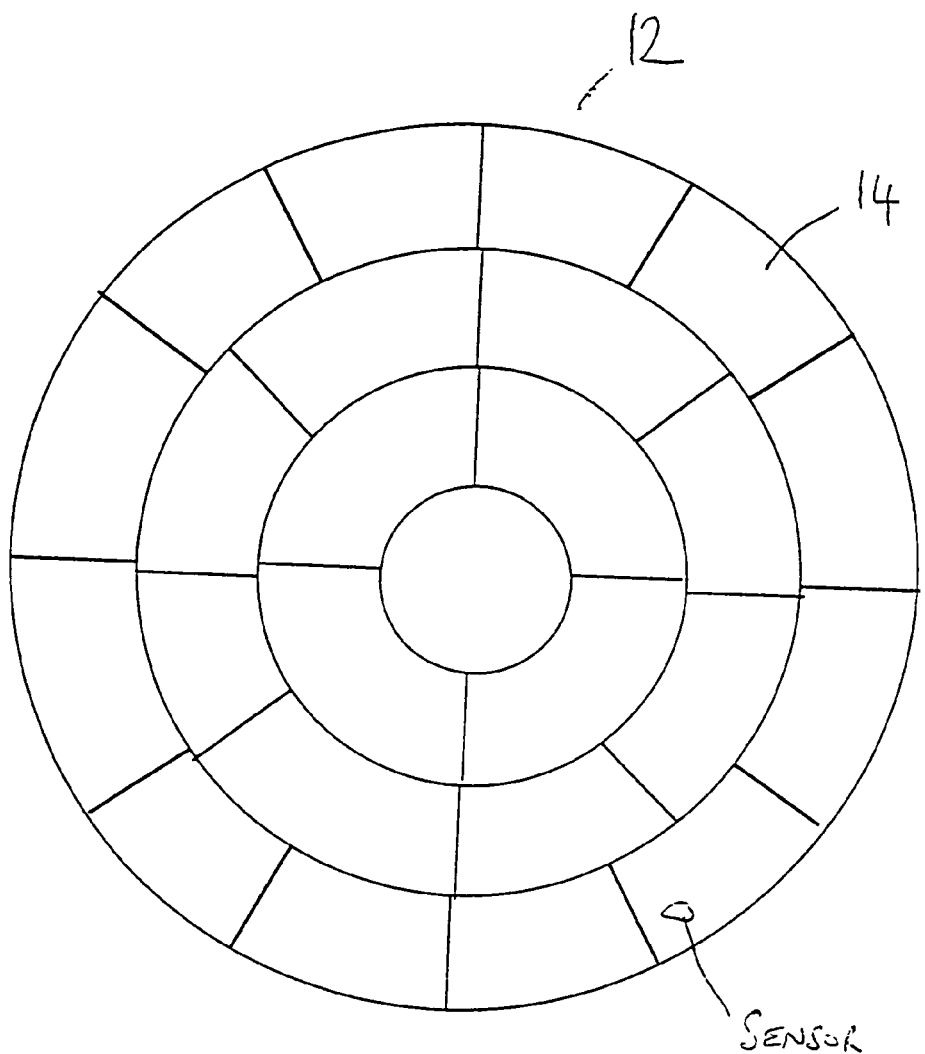
FIG. 17 shows a further embodiment of sensor location sites of a substantially constant resolution portion of a sensor array.

FIG. 17 shows a further arrangement of sensor location sites 14. The array consists of a series of concentric rings 16 each with a plurality of equally spaced sensor element sites 14. Each site is contiguous with the next one. The number of sites per ring increases four at a time, i.e. a symmetry of m=4 (see below). Each site contains at least one sensor element. As indicated it is not necessary in accordance with the present invention that the arrangement of the sites 14 is perfect in each ring and between rings provided a substantially constant resolution array is generated.

Figure 2:
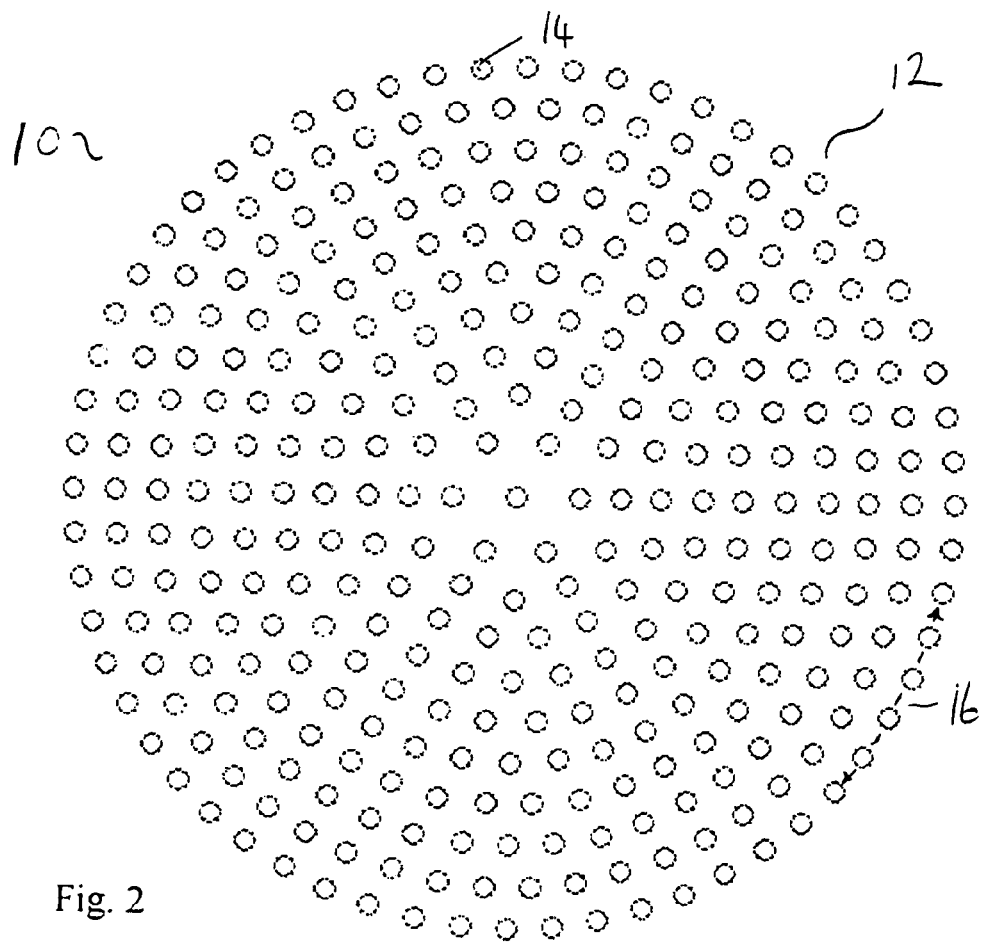
FIG. 2 shows a substantially constant resolution sensor array in accordance with an embodiment of the present invention.
Figure 3:
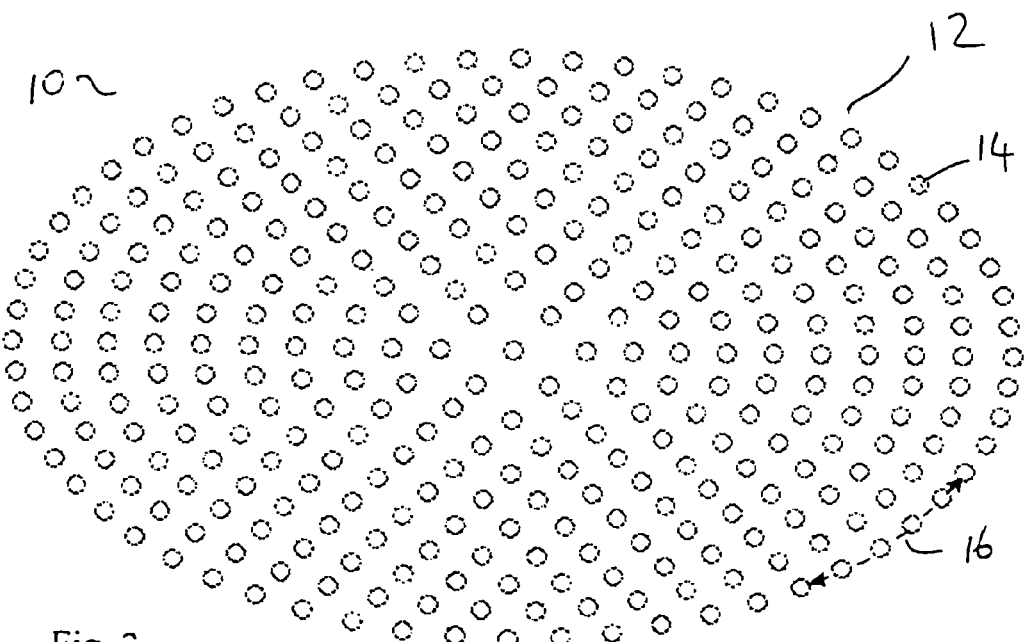
FIG. 3 shows a substantially constant resolution sensor array in accordance with an embodiment of the present invention having an elliptical form.
Figure 4:
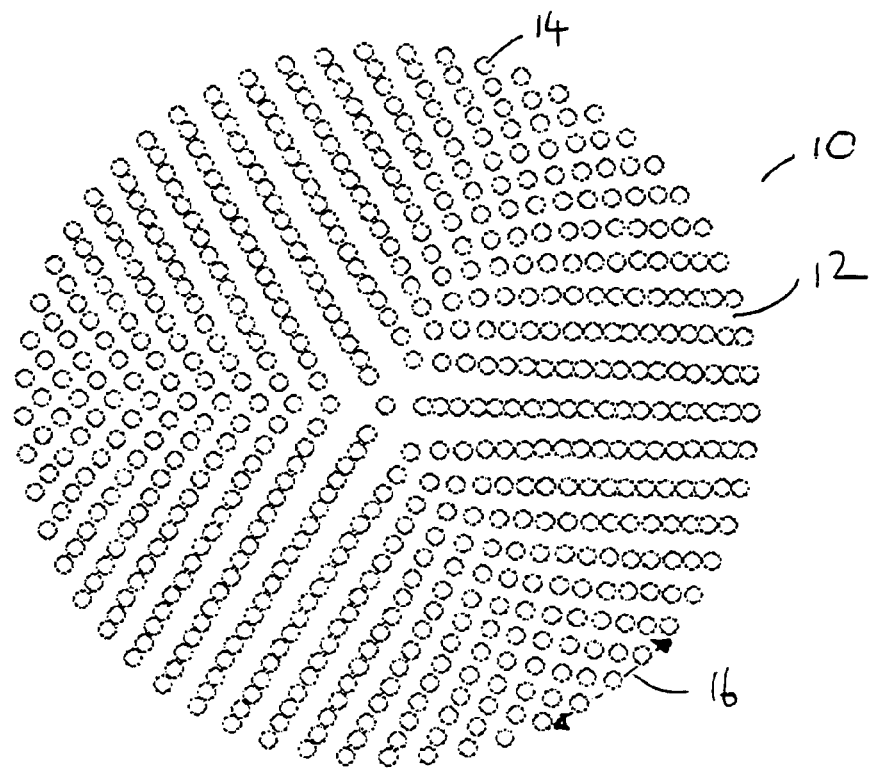
FIGS. 4 to 9 each show a substantially constant resolution sensor array in accordance with an embodiment of the present invention
Figure 5:
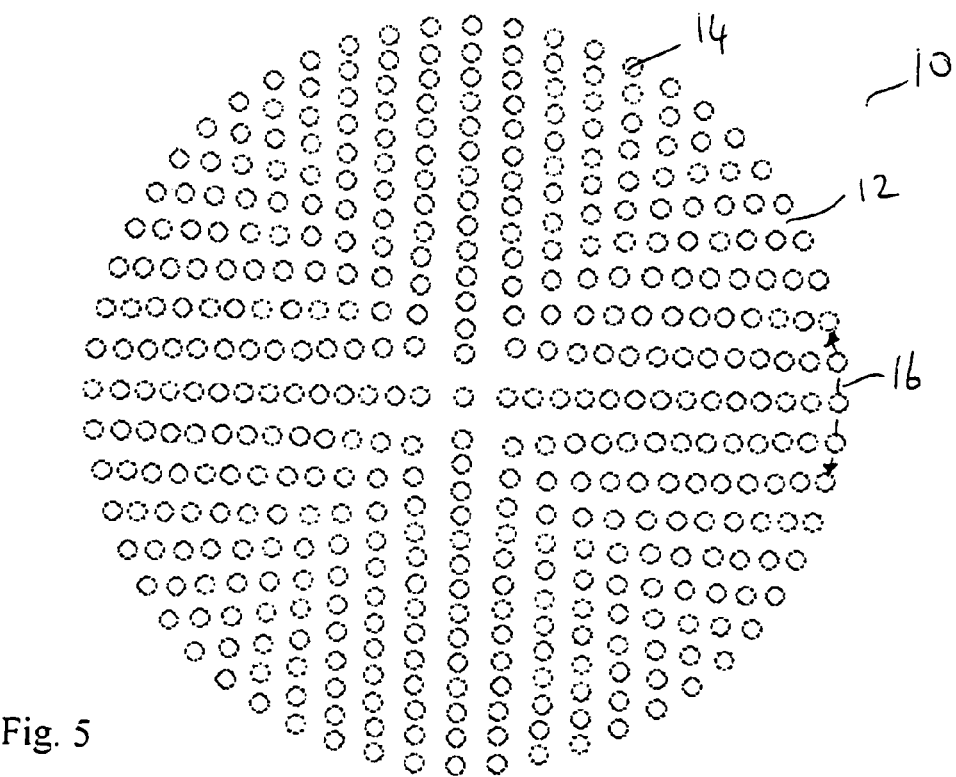
Figure 6:
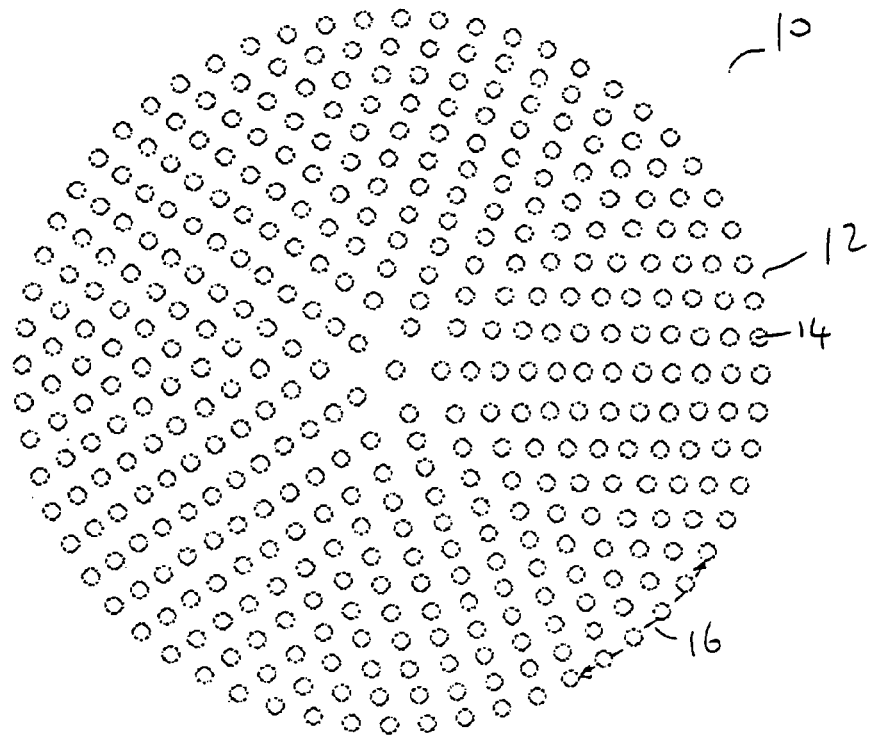
Figure 7:
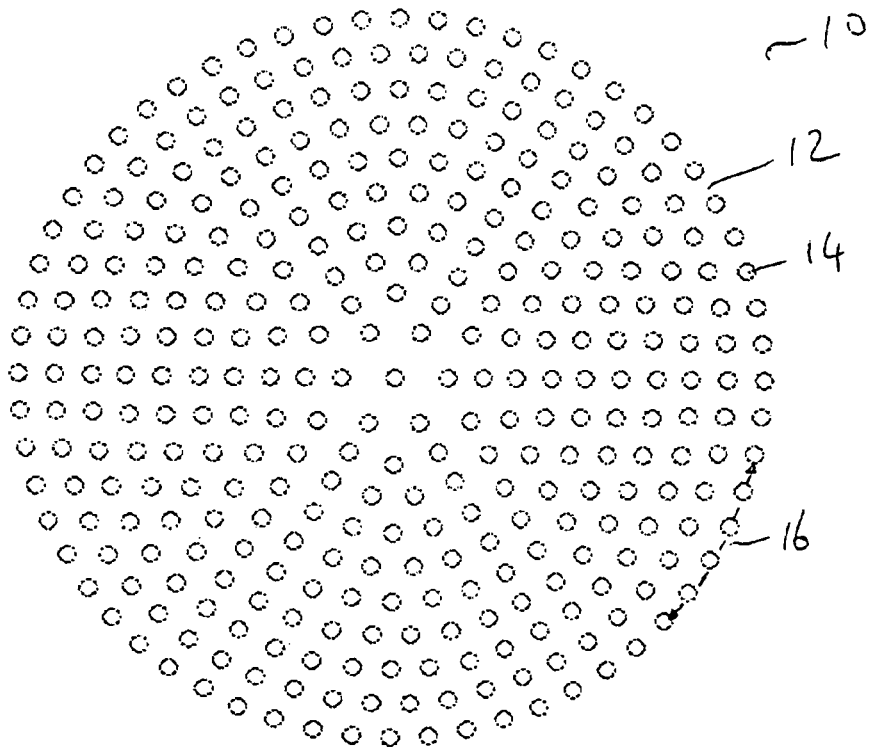
Figure 8:
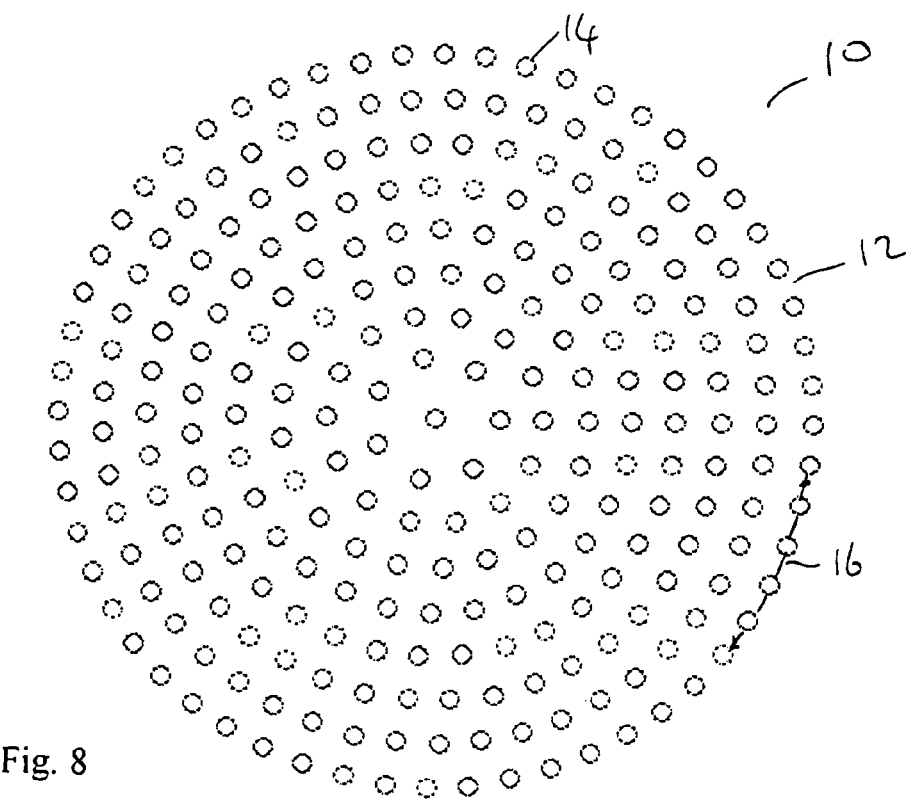
Figure 9:
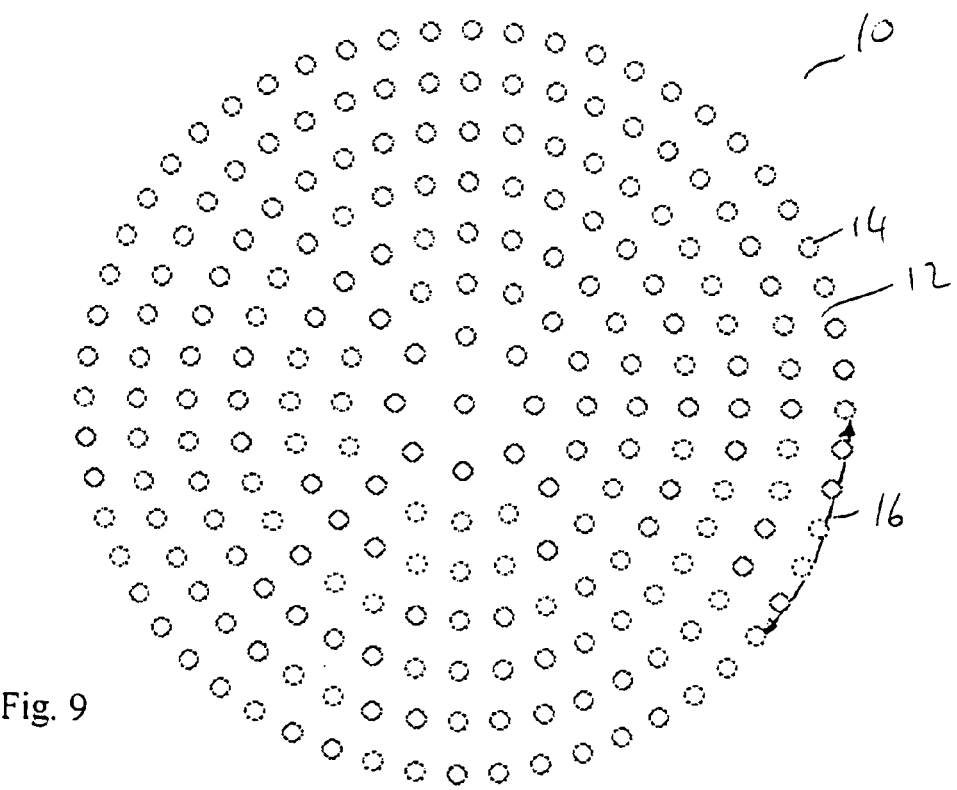

An embodiment of the present invention relates to a circular (polar) and regular arrangement of sensor element location sites 14 covering a bi-dimensional sensor array. In FIG. 2 and following figures the center of each site 14 is marked with a dot. It will be appreciated from FIGS. 16 and 17 that each site has an area determined by the bounds of the ring and its neighbors. Within each sensor element location site 14 one or more sensor elements may be located. Such sensor elements are known, for example, from EP 739 039, EP 858 111, EP 773 669, for instance. This arrangement is intended primarily to implement at least one substantially constant resolution area 12 in a sensor 10 with a polar geometry (see FIG. 2). This constant resolution and polar arrangement is realized with sensor element location sites 14 arranged on concentric rings 16 which could be circles or any other closed curve, in particular closed, smooth curve, such as an ellipse as shown in FIG. 3 or an egg shape or an oval. "Substantially constant resolution" may be defined in accordance with the present invention as a polar array of sensor element locations 14 as described above wherein the radial displacement of any sensor element location site from a regular polar distribution is ±5% of the radius (defined by the distance from the center of the relevant ring) of the respective sensor element location site, more preferably ±3% of the radius and most preferably ±1% of the radius. In addition the displacement of the sensor element location sites 14 from a regular polar distribution may be ±20% of the sensor element location site spacing in the angular direction (circumferential direction), more preferably ±10% and most preferably ±5% of the sensor element location site spacing in any ring.

A substantially constant resolution portion 12 in accordance with an embodiment of the present invention may be characterized by a constant increase in the number of sensor element location sites per ring. For example if n (n≠1) is the number of sensor element location sites at the i th circle of an m-symmetric array, circle i+1 has n+m sensor element location sites. Various different symmetries are shown in FIGS. 4 to 9. In each of these constant resolution arrays each ring 16 (other than the second ring) has m more sensor element location sites 14 than the ring inside it. In each ring 16 the sensor element location sites 14 are distributed evenly along the ring. FIGS. 4 to 9 show arrangements with m being 4, 5, 6, 7, 8, 9 respectively. The radius of each ring is calculated on the basis of equation 1.

$$R = n \times 1/2\pi + k \qquad \text{Equation 1}$$

where R is the radius, "n" is the number of sensor element location sites per ring, "1" is the minimum center-centre distance between sensor element location sites around a ring and "k" is a constant which is usually zero. The constant "k" effectively increases the dimension "1" by a fixed amount.

Figure 10:
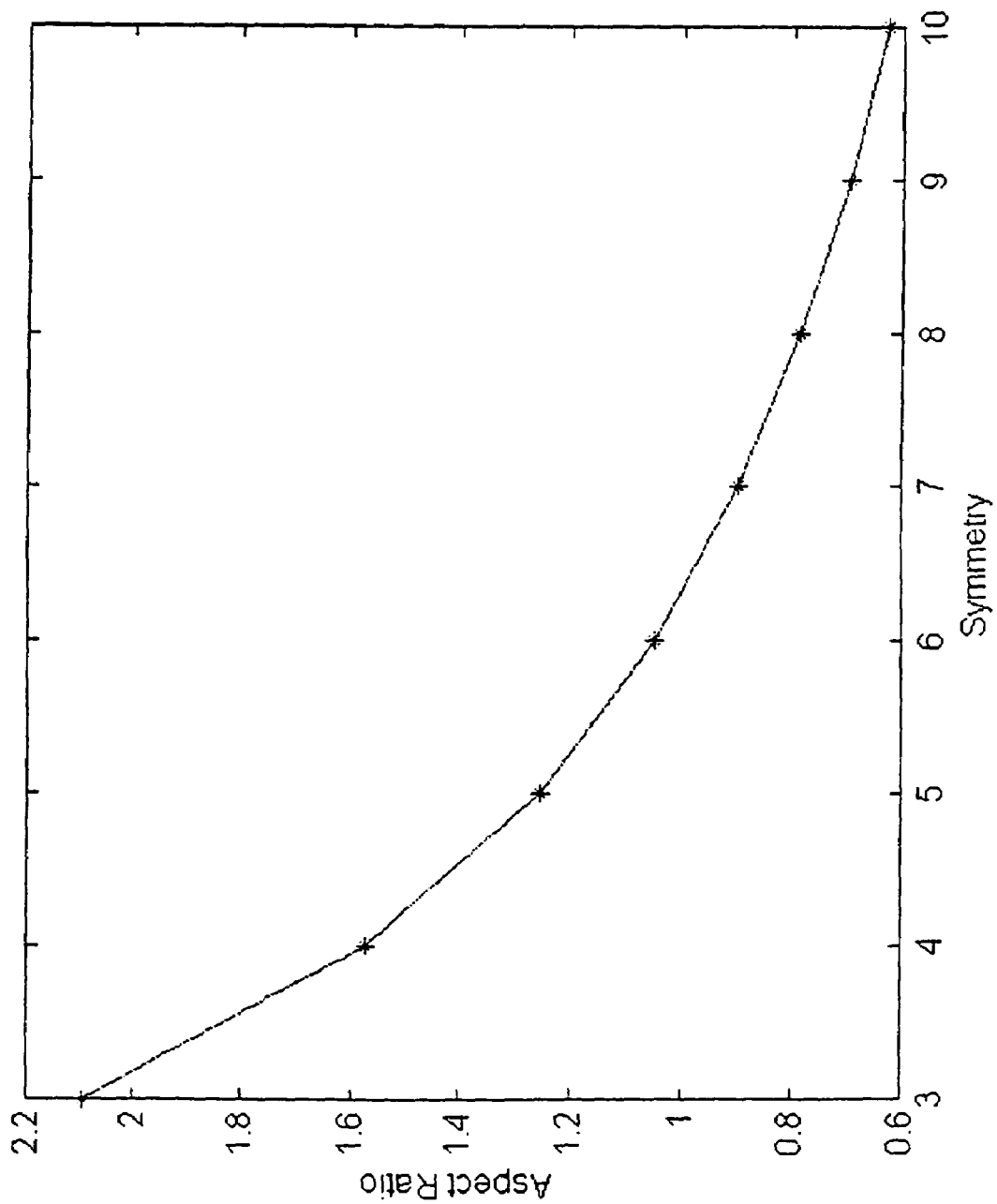
FIG. 10 is a graph showing the relationship between aspect ratio and symmetry m for substantially constant resolution sensor arrays in accordance with individual embodiments of the present invention FIGS. 11A and B are, respectively, the representation of the sensor array and the variation of sensor spacing with radial distance in accordance with an embodiment of the present invention.

The different symmetries shown are also characterized by the aspect ratio of each single sensory element locations. The aspect ratio of one sensor element location site may be defined as the ratio between the radial and the angular distances between the one sensor element location site and neighboring sensor element location sites or, alternatively, between the radial and the angular dimension of each single sensor element location sites. In the arrangements shown in FIGS. 4 to 9, the aspect ratio varies from about 2.1 to about 0.6 when going from m=3 to m=10 and is closer to the optimal value of 1 for m=6. More preferred is an aspect ratio of 0.8 to 1.6. See FIG. 10. It should be noted that the aspect ratio remains sensibly constant over each array.

Figure 11B:
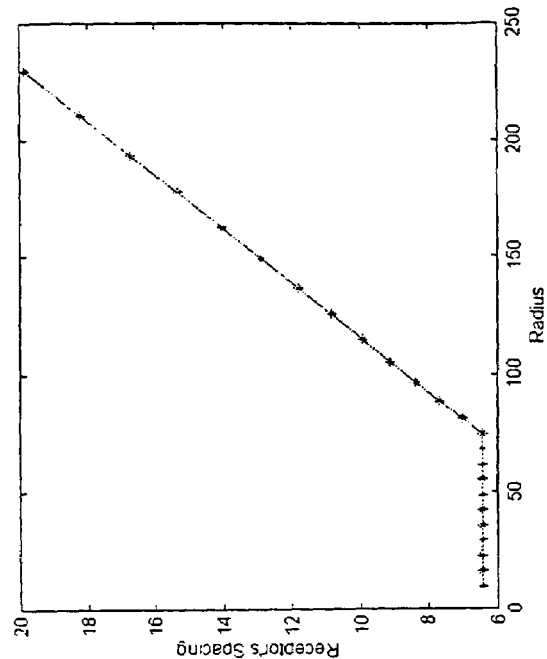
FIGS. 11C and 11D are, respectively, the representation of the sensor array and the variation of sensor spacing with radial distance in accordance with another embodiment of the present invention in which the sensor spacing merges gradually from the substantially constant resolution portion into the space variant portion.
Figure 11A:
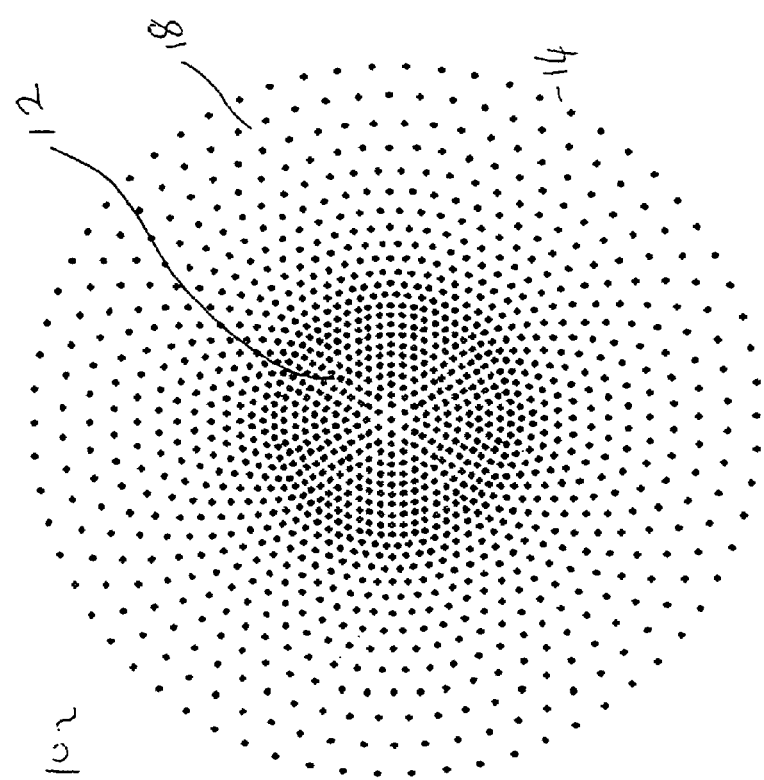
Figure 11D:
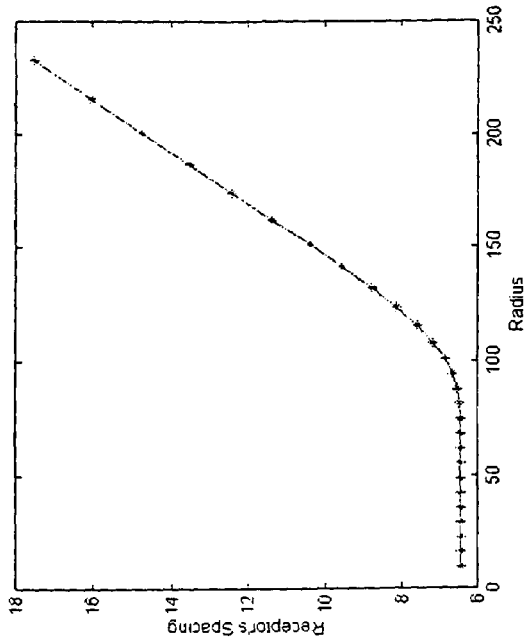
Figure 11C:
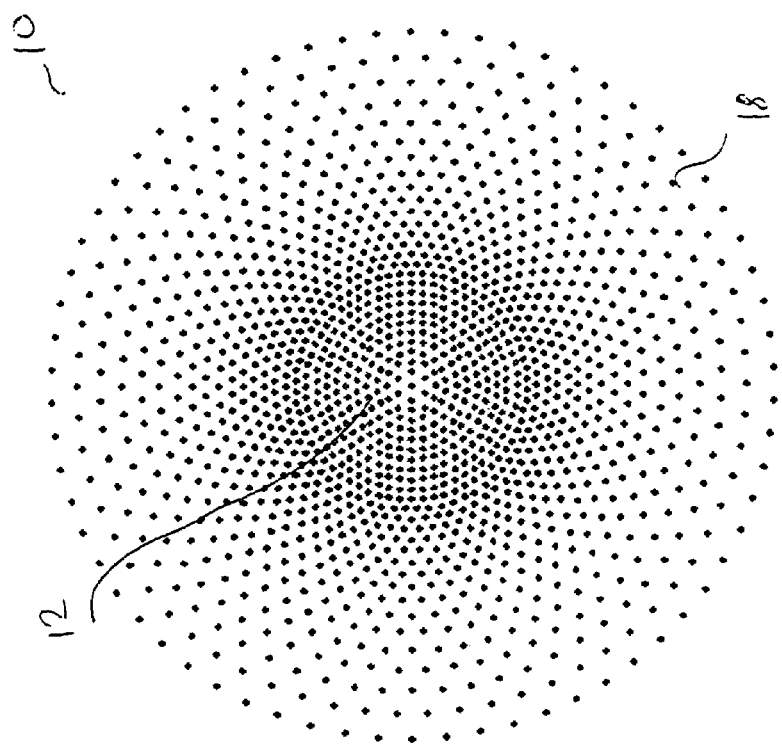

Furthermore, the spatial arrangement of constant resolution sensor element location sites 14 towards the outer diameter of the array is such that it may blend smoothly with a space-variant structure, such as an array of sensor element location sites with a log-polar density. FIG. 11a shows, as an example, how a central constant resolution circular area 12 covered with the m=6-symmetric structure shown in FIG. 7, joins with a space-variant annular region 18 realized with a log-polar geometry. A log polar mapping may be obtained by keeping the number of sensor element location sites per ring constant while the radius of each ring is defined in a log-polar manner, i.e. the ratio of the radii of adjacent ring is a constant. In such an arrangement the ratio of the diameters of adjacent rings is a constant. The outermost ring of the central constant resolution circular area 12 contains the same number of sensor element location sites as all the rings in the space-variant region 18. FIG. 11b shows how the receptor's spacing varies in the radial direction in the case of an m=6 symmetric, substantially constant resolution central region 12 and a log-polar periphery region 18. It will be noted that the spacing increases continuously when going from the constant resolution portion to the space variant portion. FIGS. 11c and 11d show a further embodiment of the present invention in which an even smoother transition between the central constant resolution area 12 and the spatially variant peripheral part 18 of the array is obtained by sensor element location site spacing adjustments at the interface between region 12 and 18. The sensor element location site spacing may be gradually varied between the constant resolution portion and the spatially variant portion as shown in FIG. 11d. This gradual change may be defined by any suitable smoothing function. If the example of a log-polar mapping is taken for the spatially variant portion then the ratio of the outer diameters of adjacent rings is a constant in this portion. In the transition region between the constant resolution portion and the spatially variant portion this constant ratio of the radii of adjacent rings is changed smoothly from the value achieved at the outer ring of the constant resolution portion to the value in the body of the spatially variant portion.

Figure 12B:
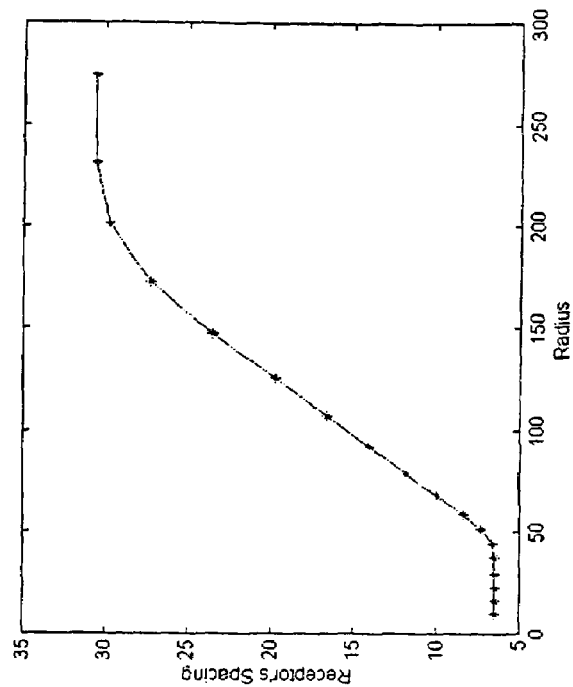
FIGS. 12A and B are, respectively, the representation of the sensor array and the variation of sensor spacing with radial distance in accordance with another embodiment of the present invention in which the sensor spacing merges gradually from the substantially constant resolution portion into the space variant portion and back to a substantially constant resolution portion
Figure 12A:
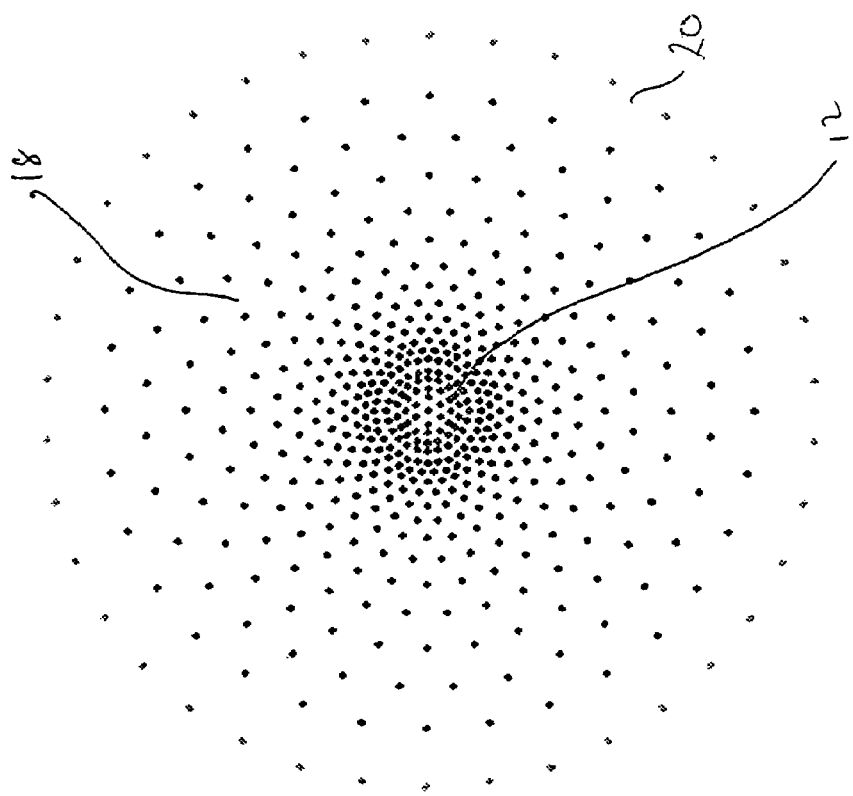

Constant resolution spatial arrangements in accordance with the present invention, can be used not only for inner regions (as shown in FIG. 2) but also for annular regions 20 surrounding, for example, a space-variant circular region 18. This is shown in FIGS. 12a and 12b in which there is a constant resolution portion 12 at the center and at the outer portion 20 of the sensor array with a log-polar arrangement in-between.

The spatial arrangements for constant resolution areas of an image sensor have the following advantages:

1) they can have a better coverage of a constant resolution circular area;
2) they can blend well with a space-variant periphery thus avoiding the discontinuities present in conventional designs;
3) they can be used both in the center (fovea) and on the periphery of a sensor array or any position in-between;
4) they allow a very smooth transition between constant resolution and space-variant regions of the sensor array;
5) no semiconductor processing time or area is "wasted" and the maximum resolution is provided over all of the central region (fovea) and not just part of it; and
6) the aspect ratio of pixels can be very close to the optimal value of 1 which also results in better processing.

Sensor arrangements according to the present invention can be used as the basic sensor array of a color visual sensor. In the case of a tri-chromatic color sensor the preferred arrangements are those corresponding to multiple-of-m=three symmetry (such as 3, 6, 9 etc.).

Figure 13B:
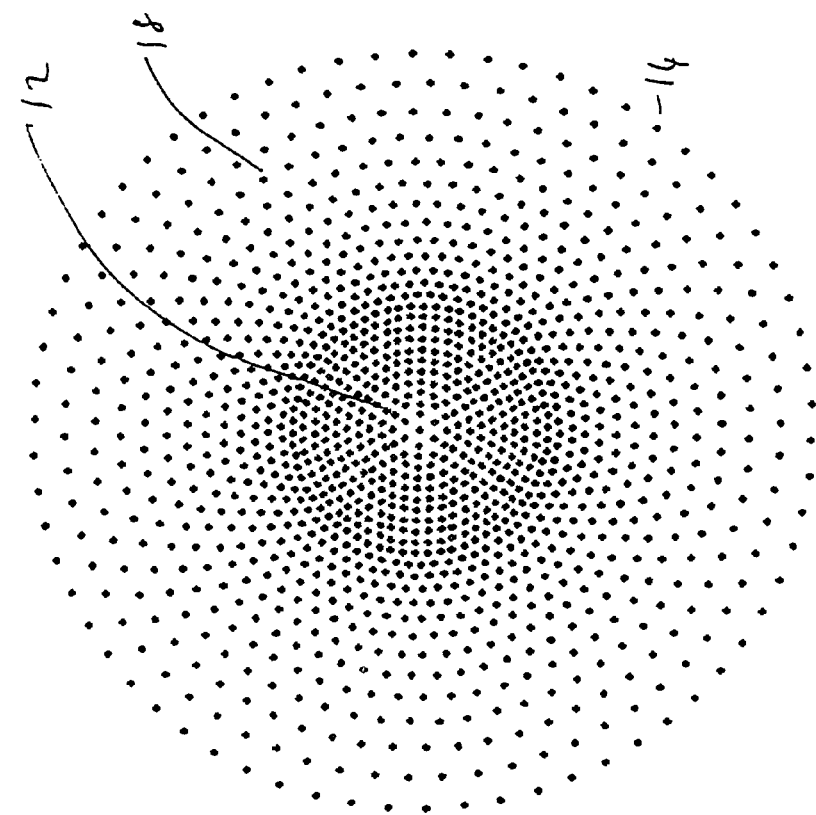
FIGS. 13A and 13B show individual embodiments of sensor arrays including a substantially constant resolution portion and an outer space variant portion whereby in FIG. 13B the sensor location sites in each ring are displaced by one half of the site spacing compared to the previous ring.
Figure 13A:
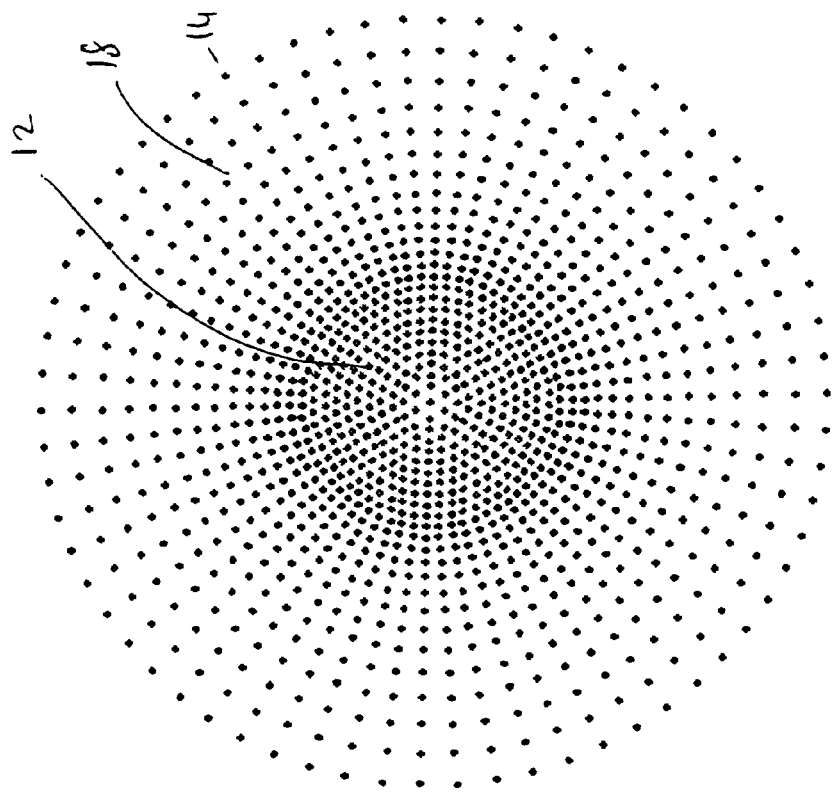

Further embodiments of the present invention relate to a sensor arrangement of concentric rings 16 of sensor element location sites 14 of either a constant resolution region 12 and/or a space variant region 18 wherein the string of sensor element location sites 14 of each ring 16 is rotated with respect to its neighboring rings 16 by half the spacing between the sensor element location sites. In this way it is possible to transform an array with a quasi-square tessellation (FIG. 13a) into an array with a quasi-hexagonal one (FIG. 13b). The advantage of this angular rotation between rings is a better structure for color reconstruction.

An example of a sensor array in accordance with embodiments of the present invention will now be described. For the outer spatially variant region 18, the number of sensor element location sites per ring is chosen to be either 66 or 90. Each sensor element location site 14 includes one sensor element having a diameter of about 7 micron. This results in an diameter for the inner constant resolution portion of about 73 micron and about 100 micron for each design, respectively. The central constant resolution regions are implemented with m=6. The results are shown in Table 1 and shown in FIGS. 14 and 15 respectively.

TABLE 1

| Pixels per ring (periphery) | Fovea radius micron | Min size of sensor element micron | Max. size micron | Pixels center | Pixels - outer | Chip radius micron | Rings - center | Rings - outer |
| --- | --- | --- | --- | --- | --- | --- | --- | --- |
| 66 | 73 | 7 | 17 | 330 | 726 | 200 | 10 | 11 |
| 90 | 100 | 7 | 13 | 630 | 900 | 200 | 14 | 10 |

Figure 14:
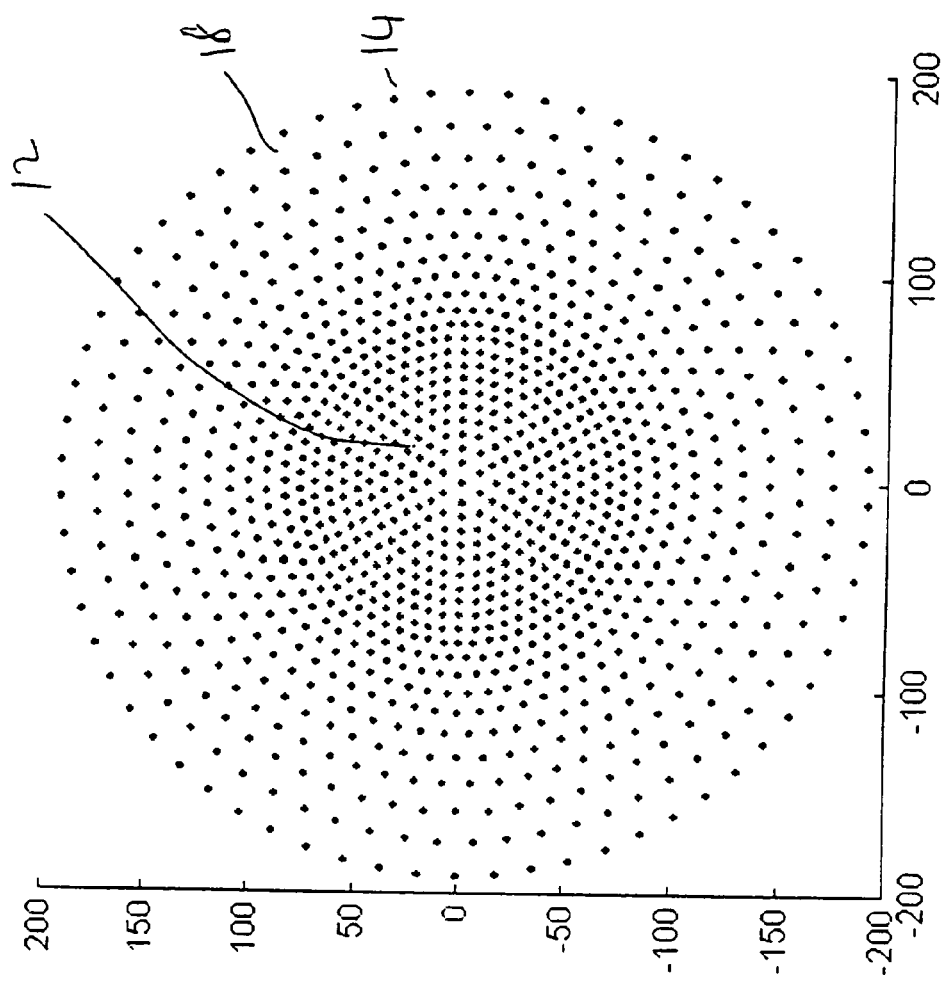
FIGS. 14 and 15 show individual embodiments of sensor arrays including a substantially constant resolution portion and an outer space variant portion.
Figure 15:
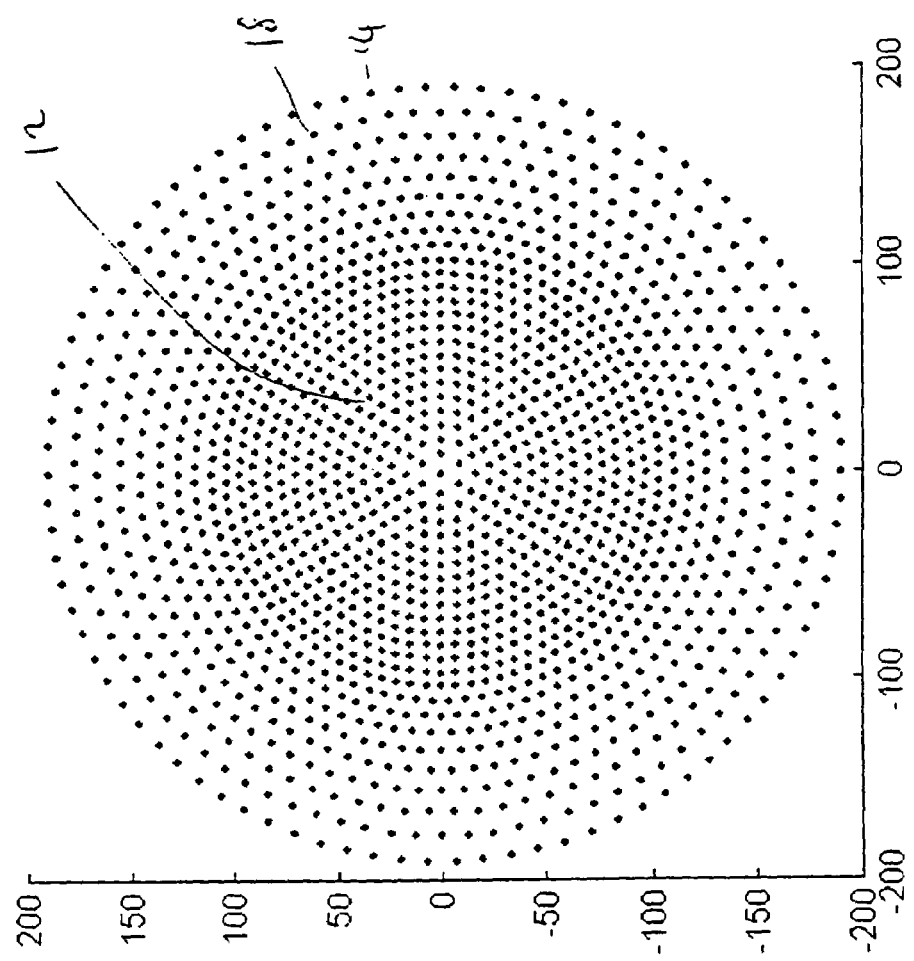

The two sensor arrays shown in FIGS. 14 and 15 demonstrate the absence of local and global discontinuities. In these designs there is one sensor element per sensor element location site and this sensor element completely fills the location site.

The sensor arrays as described above in accordance with any of the embodiments of the present invention may find advantageous use in cameras, especially miniature cameras. Such cameras may be included in surveillance schemes such as for door or intruder surveillance, cameras for mounting in mobile telephones or lap-top or palm-top computers for capturing still and video images for transmission over telecommunications networks or similar, "eye-ball" cameras for mounting close to a Personal Computer for capturing still or video images and for transmission over telecommunications networks such as company Intranets, WAN's or the Internet or via telephone lines.

The sensor arrays as described above may be associated with active or passive read-out electronics and digital signal processing circuitry to provide an electronic digital output of the image sensed by the array.

While the invention has been shown and described with reference to preferred embodiments, it will be understood by those skilled in the art that various changes or modifications in form and detail may be made without departing from the scope and spirit of this invention.

What is claimed is:

1. A sensor array comprising: a substantially constant resolution portion comprising a first series of first concentric closed rings, each first closed ring comprising a monodimensional array of equally spaced sensor element location sites, each location site including at least one sensor element; and a spatially variant portion comprising a second series of second concentric closed rings, the second series being concentric with the first series and each second closed ring comprising a monodimensional array of equally spaced sensor element location sites, each location having at least one sensor element, the spatially variant portion being surrounded by the substantially constant resolution portion, and the density of sensor element location sites continuously increasing or decreasing between the substantially constant resolution portion and the spatially variant portion.

2. The sensor array according to claim 1, wherein each sensor element comprises electronics technology.

3. The sensor array according to claim 2, wherein each sensor element comprises a CMOS pixel.

4. The sensor array according to claim 2, wherein each sensor element comprises a MOS pixel.

* * * * *

UNITED STATES PATENT AND TRADEMARK OFFICE
CERTIFICATE OF CORRECTION

PATENT NO.        : 7,009,645 B1                                  Page 1 of 2
APPLICATION NO.   : 09/675095
DATED             : March 7, 2006
INVENTOR(S)       : Sandini et al.

It is certified that error appears in the above-identified patent and that said Letters Patent is hereby corrected as shown below:

| Column | Line | Error Description |
|---|---|---|
| Title Pg. Item (75) (Inventors) | 1 | Delete "Genoa" and insert -- Genova --, therefor. |
| Title Pg. Item (75) (Inventors) | 2 | Delete "Genoa" and insert -- Genova --, therefor. |
| Title Pg. Item (73) (Assignees) | 1 | Delete "Genoa" and insert -- Genova --, therefor. |
| Title Pg. Item (57) (Abstract) | 5 | Delete "aleast" and insert -- least --, therefor. |
| Page 2 Title Pg. 2 Item (56) (Other Publications) | | Delete "1.2 um" and insert -- 1.2 μm --, therefor. |
| Page 2 Title Pg. 3 Item (56) (Other Publications) | | Delete "Journ" and insert -- Journal --, therefor. |
| Page 2 Title Pg. 3 Item (56) (Other Publications) | | Delete "VOl." and insert -- Vol. --, therefor. |
| Page 2 Title Pg. 5 Item (56) (Other Publications) | | Delete "H." and insert -- N. --, therefor. |
| Page 2 Title Pg. 12 Item (56) (Other Publications) | | Delete "P" and insert -- P. --, therefor. |
| Sheet 7 of 14 (Fig. 11B) | 1 | Delete " Receptor's Spacing " and insert -- Receptor's Spacing --, therefor. |

UNITED STATES PATENT AND TRADEMARK OFFICE
CERTIFICATE OF CORRECTION

PATENT NO. : 7,009,645 B1  Page 2 of 2
APPLICATION NO. : 09/675095
DATED : March 7, 2006
INVENTOR(S) : Sandini et al.

It is certified that error appears in the above-identified patent and that said Letters Patent is hereby corrected as shown below:

| 11 | Sheet 8 of 14 (Fig. 11D) | 1 | Delete " Receptor's Spacing " and insert -- Receptor's Spacing --, therefor. |
| 12 | 1 | 41 | Delete "graining" and insert -- gaining --, therefor. |
| 13 | 2 | 23 | Delete "aleast" and insert -- least --, therefor. |
| 14 | 3 | 14 | After "invention" insert -- . --. |
| 15 | 3 | 18 | After "invention" insert -- . --. |
| 16 | 3 | 37 | After "portion" insert -- . --. |
| 17 | 6 | 25 (Approx.) | Delete "i th" and insert -- i$^{th}$ --, therefor. |
| 18 | 6 | 65 | Delete "m=6-symmetric" and insert -- m=6 symmetric --, therefor. |

Signed and Sealed this

Twenty-third Day of January, 2007

JON W. DUDAS
*Director of the United States Patent and Trademark Office*